United States Patent Office 3,309,450
Patented Mar. 14, 1967

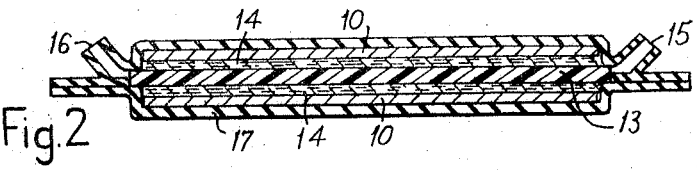
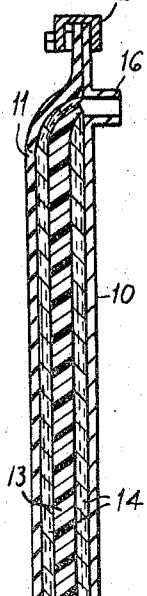
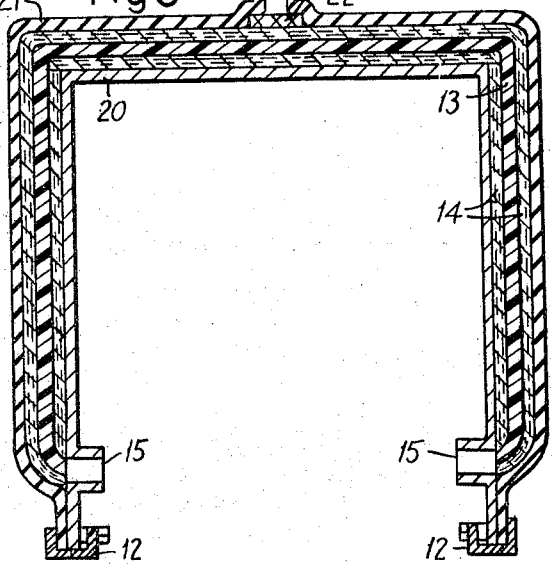
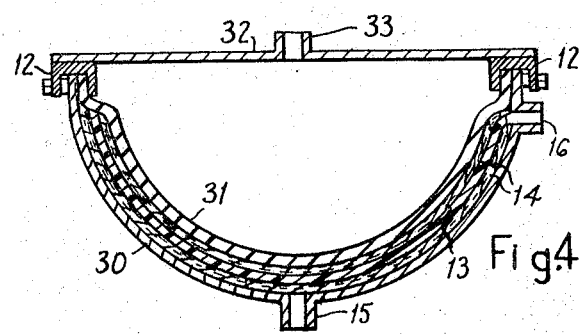
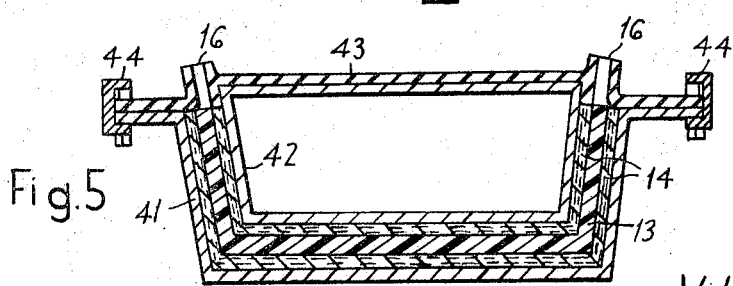

3,309,450
METHOD OF LAMINATING REINFORCED
PLASTICS
William Rodgers, 15 Sefton Ave., Clayfield,
Brisbane, Australia
Filed July 2, 1962, Ser. No. 206,590
Claims priority, application Great Britain, July 5, 1961,
24,381/61
1 Claim. (Cl. 264—257)

The production of synthetic resin moldings reinforced with fibrous material is made difficult by the slow rate of travel of the liquid resin through the reinforcing fibrous material. This is due to the resin viscosity and the small flow passages or interstices between the fibres.

Reinforced synthetic resin moldings made by injection or suction of resin into a mold have thus been limited in size, or high resin transport pressure or suction and a complex mold have been necessary. Reinforced moldings made by the "hand lay" method of contact molding, in which liquid resin is placed on the reinforcing fibrous material and worked between the fibres with hand tools, can be made in large sizes, but suffer from the disadvantage of high labour costs and slow production rates.

From one aspect, the invention consists in a method of manufacturing a synthetic resin molding reinforced with fibrous material, which consists in the steps of placing at least one layer of reinforcing fibrous material in a mold, placing a spacer material adjacent to said layer or layers of reinforcing fibrous material, introducing synthetic resin in liquid form into the mold to impregnate the spacer material and the reinforcing fibrous material, and allowing the resin to set sufficiently for the molding to be removed from the mold, the spacer material being so constructed or arranged that it provides less resistance to resin flow through the mold than does the reinforcing fibrous material.

From another aspect, the invention consists in a synthetic resin molding having at least one zone containing reinforcing fibrous material and an adjacent zone containing a spacer material which, during the making of the molding, provided less resistance to resin flow through the mold than did the reinforcing fibrous material.

From yet another aspect, the invention consists, in the manufacture of synthetic resin moldings reinforced with fibrous material, in the combination of a mold, reinforcing fibrous material, a spacer material so constructed or arranged that it provides less resistance to resin flow through the mold than does the reinforcing fibrous material, means for introducing liquid synthetic resin into the mold, and at least one air outlet from the mold.

Embodiments of the invention will now be described, by way of example, with reference to the accompanying drawings, in which:

FIGURE 1 is a longitudinal section of a mold prepared for the manufacture of a molded flat sheet or panel of synthetic resin reinforced with fibrous material;

FIGURE 2 is a longitudinal section of a different mold prepared for the manufacture of a molded flat sheet or panel of synthetic resin reinforced with fibrous material;

FIGURE 3 is a longitudinal section of a mold prepared for the manufacture of a molded tank of synthetic resin reinforced with fibrous material;

FIGURE 4 is a longitudinal section of a mold prepared for the manufacture of a hemispherical molding of synthetic resin reinforced with fibrous material; and FIGURE 5 is a longitudinal section of a mold having two rigid mold parts and prepared for the manufacture of a molded tray of synthetic resin reinforced with fibrous material.

Referring to FIGURE 1, a mold for the manufacture of a flat sheet or panel comprises a flat rigid mold part 10 which is mounted vertically by means of supports (not shown), and a flexible mold part 11 which is secured at its edges to the edges of the rigid mold part 10 by means of clamps 12. The flexible mold part 11 is conveniently made from a sheet of polyvinyl alcohol, and in one example a sheet having a thickness of 0.010" was used.

A layer 14 of reinforcing fibrous material in the form of glass fibre chopped strand mat is arranged adjacent to each of the mold parts 10 and 11, and between these layers 14 is a layer 13 of heat insulating material having both its surfaces provided with grooves to allow resin flow through the mold with less resistance than through the reinforcing fibrous material.

A quantity of a liquid cold-setting polyester resin sufficient to form the required sheet or panel is injected into the mold through the resin inlet passage 15 from a container (not shown) pressurized to about 10 lb./sq. in. The liquid resin collects in a pool in the lower part of the mold, bulging out the flexible mold part 11. The mold is then evacuated through the air outlet passage 16 to a pressure of about 5" Hg absolute, and the liquid resin is drawn or sucked up in the mold, first flowing through the layer 13 of spacer material and then passing more slowly from the layer 13 into the layers 14 of reinforcing fibrous material. The liquid resin thus enters the layers 14 over a large surface area, and has to travel only across the thickness of each layer 14. In this way, the reinforcing fibrous material is impregnated with resin much more readily than if the resin has to flow longitudinally through the layers 14 from the edge of the mold. The molding process can be carried out with the mold in any attitude, i.e. vertical, horizontal, or inclined, and with the resin inlet above or below the air inlet.

When the layers 13 and 14 are fully impregnated with resin, the liquid resin is allowed to set or harden sufficiently for the molded sheet or panel to be removed from the mold.

In one example, a mold for a panel 5' long by 3' wide had its spacer material and reinforcing material impregnated with resin in about three minutes.

The embodiment of FIGURE 1 may be modified by the insertion of a second rigid mold between the fibrous reinforcing material and the flexible mold 11.

Referring to FIGURE 2, another form of mold for the manufacture of a flat sheet or panel comprises two flat rigid mold parts 10 contained in a flat flexible bag 17 made from polyvinyl alcohol sheets and having a resin inlet passage 15 at one edge and an air outlet passage 16 at the other edge. Layers 14 of reinforcing fibrous material and a layer 13 of spacer material are arranged in the mold in a manner similar to that described with reference to FIGURE 1.

Liquid resin is injected into the mold through the resin inlet 15 and the mold is evacuated and the molding is made in a manner similar to that described with reference to FIGURE 1.

The embodiment of FIGURE 2 may be modified by the omission of one or both rigid mold parts 10, or by the insertion of further similar rigid mold parts 10, parallel to those shown and spaced from them by further layers of reinforcing fibrous material and spacer material. It is thus possible to make several panels simultaneously.

Referring now to FIGURE 3, a mold for the manufacture of a tank or cistern comprises a rigid mold part 20 which will mold the inner surface of the tank, and a flexible mold part 21 which is secured at its edges at the edges of the rigid mold part 20 by means of clamps 12.

Layers 14 of reinforcing material, which may be glass fibre chopped strand mat, and a layer 13 of heat insulating material having grooves on both its surfaces, are aranged in the mold in a manner similar to that described with reference to FIGURE 1. The rigid mold part has two resin inlets 15 near its lower edge. An air outlet 16 is formed in the top of the flexible mold part 21. A local concentration 22 of spacer material is arranged adjacent to the air outlet 16 in order to distribute the effect of the suction evacuating the mold.

Liquid resin is injected into the mold through the resin inlets 15 and the mold is evacuated and the molding is made in a manner similar to that described with reference to FIGURE 1.

In the embodiment of FIGURE 3, it is not essential for resin to enter at the lower part of the mold and for air to be withdrawn at the top. This arrangement can, if desired, be reversed.

Higher or lower resin injection pressures than the 10 lb./sq. in. quoted as an example can be used, but higher pressures generally require more expensive apparatus. The resin can also be introduced into the mold by means of a gravity feed.

The mold can, if desired, be evacuated to a lower or higher pressure than the 5″ Hg absolute quoted as an example. The lower pressure will result in a thinner and weaker molding but consequent resin economy, because the flexible mold part is pressed closer to the rigid mold part by atmospheric pressure.

It is also possible to inject the resin into the mold and vacuate the air simultaneously, the main requirement being the existence of a pressure difference between the resin inlet and air outlet.

Referring now to FIGURE 4, a rigid mold part 30 is of hemispherical form, and has a resin inlet 15 at its lowest point and an air outlet 16 near its upper edge. There is an arrangement in the mold of a layer 13 of spacer material and two layers 14 of reinforcing fibrous material similar to that described with reference to FIGURE 1, and a flexible mold part 31 is clamped in place with clamps 12. A rigid cover plate 32 is placed over the top of the mold and pressure, for example air pressure, can be applied to the outer surface of the flexible mold part 31 through a pressure inlet 33.

In use, the calculated correct amount of liquid resin is injected through the resin inlet 15 and forms a pool at the bottom of the mold, bulging up the flexible mold part 31. The air in the mold is then pressed out through air outlet 16 by the application of pressure to the flexible mold part 31. The resin then impregnates the layers 13 and 14. A combination of evacuation of air and external pressure on the mold part 31 can be used, or the apparatus can be used as described with reference to FIGURES 1 and 2.

FIGURE 5 illustrates an alternative method of introducing resin into a mold and shows the manufacture of a tray. The mold comprises two rigid mold parts, an outer mold part 41 and an inner mold part 42. Adjacent to the outer mold part 41 is a layer 14 of glass fibre chopped strand mat, then a layer 13 of spacer material and then another layer 14 of chopped strand mat. The inner mold part 42 is held in place by a flexible mold part retaining member 43 clamped to the edges of the outer mold part 41 by means of clamps 44, and having two air outlets 16 near its edges.

In use, the calculated correct amount of liquid resin is placed on the layers of material at the bottom of the outer mold part 41 before the inner mold part 42 is put in place, and then by evacuation of air through the air outlet 16 the liquid resin is caused to flow through the layer 13 of spacer material and thus impregnates the layers 14 of reinforcing fibrous material.

This type of apparatus and method has been found suitable for making trays.

Apparatus similar to that shown in FIGURE 5, but having a resin inlet, can be used with resin injection or suction techniques as previously described. The use of two rigid mold parts is particularly advantageous when the synthetic resin molding is required to have both of its surfaces particularly smooth and well-finished, and is, of course, necessary when surface features are required to be reproduced on both surfaces of the molding. The use of one rigid and one flexible mold part is generally found suitable for simpler moldings and for very large moldings where the cost of two large rigid mold parts would be prohibitive.

The molds used in the present invention are of four general types: the flat mold, illustrated by FIGURES 1 and 2; the mold with a rigid male mold part (FIGURE 3); the mold with a rigid female mold part (FIGURE 4); and the mold with rigid male and female mold parts (FIGURE 5).

It is possible to include an insert of nonporous material in a synthetic resin molding to provide additional strength and/or to reduce the quantity of resin required. Such a construction can be particularly valuable for the manufacture of insulated panels, for example, cold store wall panels. The insert can be located within a layer of spacer material, or if it is outside the layer it can be provided with a surface having similar properties to those of the spacer material. For example, a balsa wood or foamed concrete insert can have a grooved or scored surface, or it can be wrapped in spacer material. Blocks or sheets of expanded synthetic plastic material, such as expanded polystyrene, expanded polyvinyl chloride, or expanded polyurethane, which have a closed cell structure, can have their surface cells pierced, or cut open so as to be made inter-connecting to provide flow passages for the resin. Grooves may be made in the surfaces to allow resin flow.

Two excellent surfaces can be obtained, even when using one flexible mold part, by placing or including a thin metal sheet, for example, an aluminium sheet, on the flexible mold part side. This construction, combined with the above-mentioned inserts, is particularly valuable for making components such as refrigerator cabinet walls.

Decorative finishes may be obtained by placing a patterned material against the mold.

The spacer material can be of many different kinds, provided that it is so constructed or arranged that it provides less resistance to resin flow through the mold than does the reinforcing fibrous material. It has to be stiff enough to hold the layers of reinforcing material apart so that they do not close or block the flow path or paths for the resin. Other suitable materials, as well as "Netlon," include knitted string or wire; knitted strands, stiffened with resin if necessary; a thick-stranded textile fabric; a stiffened knitted or woven textile fabric stiffened for example with resin; a stiff corrugated material such as resin-coated thin cloth; paper of corrugated form, stiffened if necessary; a cellular material having inter-connecting cells; and matted or felted material with a stiff open structure.

Another possible spacer material could be formed from small tubes having porous walls, for example open helixes of stiff material, and any insert or former can act as a spacer material if its surface is grooved or channelled.

Both the spacer material and the reinforcing fibrous material can be pre-formed in layers shaped to fit the molds in which they are to be used.

While the examples have described spacer material with a layer of reinforcing fibrous material on both sides, i.e., for making moldings with reinforcing fibrous material adjacent to both surfaces, it is possible to use spacer material on only one side of the fibrous material, although this arrangement does not provide a molding equal in strength to a molding with a fibrous material adjacent to both surfaces.

Grooves or corrugations in one or both mold surfaces may be used to assist the flow of resin through the mold to impregnate the reinforcing fibrous material.

The resin used is generally of the type commonly used in the reinforced plastics industry, for example, a polyester or epoxy resin, and it should be of suitably low viscosity to allow short impregnation times. Generally a cold setting resin is used, although a hot setting resin could be used if its special properties (permitting, for example, quick oven-curing,) were advantageous.

By means of the invention, dense and substantially void-free reinforced synthetic resin moldings may readily and quickly be manufactured. Because of the low pressure differential which is all that is required to obtain flow of the liquid resin throughout the mold, heavy and unduly strong molds are not required, and the risk of displacement of the reinforcing fibrous material within the mold by the advancing resin is minimised by the constant uniform pressure between the mold parts.

I claim:

A method of manufacturing a synthetic resin molding forming a heat insulating panel or wall structure, which comprises the steps of placing in a mold a core layer of heat insulating material having grooves along the opposite surfaces thereof and two layers of reinforcing fibrous material disposed against said surfaces respectively, said heat insulating material being of closed cell structure and relatively non-porous so as to provide greater resistance to resin flow therethrough than said layers of fibrous material do, introducing synthetic resin in liquid form into the mold and causing the said liquid resin to flow along said grooves and thereby to impregnate said layers of reinforcing fibrous material, and allowing the resin to set sufficiently for the molding to be removed from the mold.

References Cited by the Examiner

UNITED STATES PATENTS 2,863,797   12/1958   Meyer.
2,913,036   11/1959   Smith.

FOREIGN PATENTS 456,037   4/1949   Canada.

OTHER REFERENCES

"4 Ways of Building Plastic Boats"—Alfers, Modern Plastics, November 1952, pages 102–106.

EARL M. BERGERT, *Primary Examiner.*

M. E. ROGERS, H. F. EPSTEIN, *Assistant Examiners.*